US011725415B2

(12) United States Patent
Chen et al.

(10) Patent No.: US 11,725,415 B2
(45) Date of Patent: Aug. 15, 2023

(54) ADA DOOR KNOB

(71) Applicant: Spectrum Brands, Inc., Middleton, WI (US)

(72) Inventors: Andy Chen, Xiamen (CN); Elliott Schneider, Foothill Ranch, CA (US)

(*) Notice: Subject to any disclaimer, the term of this patent is extended or adjusted under 35 U.S.C. 154(b) by 190 days.

(21) Appl. No.: 17/136,575

(22) Filed: Dec. 29, 2020

(65) Prior Publication Data

US 2021/0207397 A1 Jul. 8, 2021

Related U.S. Application Data

(60) Provisional application No. 62/956,890, filed on Jan. 3, 2020.

(51) Int. Cl.
| | | |
|---|---|---|
| E05B 1/00 | (2006.01) | |
| E05C 1/12 | (2006.01) | |
| F16H 19/04 | (2006.01) | |
| E05C 1/00 | (2006.01) | |

(52) U.S. Cl.
CPC ............... *E05B 1/003* (2013.01); *E05C 1/12* (2013.01); *F16H 19/04* (2013.01); *E05C 1/004* (2013.01); *E05Y 2201/716* (2013.01); *E05Y 2201/722* (2013.01); *E05Y 2900/132* (2013.01)

(58) Field of Classification Search
CPC ......... Y10T 292/0993; Y10T 292/0908; E05B 1/003; E05B 1/00; E05B 1/0007; E05B 1/0069; E05B 65/10; E05B 65/106; E05B 65/1066; E05B 65/0035; E05C 1/12; E05C 1/004; F16H 19/04; E05Y 2201/716; E05Y 2201/722; E05Y 2900/132
See application file for complete search history.

(56) References Cited

U.S. PATENT DOCUMENTS

| | | | | | |
|---|---|---|---|---|---|
| 1,805,997 | A * | 5/1931 | Rhiner | ...................... | E05C 1/12 292/165 |
| 3,865,414 | A * | 2/1975 | Schlage | ..................... | E05C 1/14 70/DIG. 73 |
| 4,052,092 | A * | 10/1977 | Bergen | ...................... | E05C 1/14 70/462 |
| 5,088,778 | A * | 2/1992 | Lin | ........................... | E05C 1/14 292/336.3 |
| 5,513,510 | A * | 5/1996 | Solovieff | .............. | E05B 13/005 70/DIG. 73 |
| 6,257,030 | B1 * | 7/2001 | Davis, III | ............... | E05C 9/047 70/109 |
| 9,605,444 | B2 * | 3/2017 | Rickenbaugh | ............ | E05C 9/12 |

(Continued)

FOREIGN PATENT DOCUMENTS

| | | | | | |
|---|---|---|---|---|---|
| CA | | 2855367 A1 * | 3/2015 | ........... | E05B 1/0092 |
| DE | 202020101567 U1 * | | 5/2020 | .............. | E05B 7/00 |

(Continued)

*Primary Examiner* — Kristina R Fulton
*Assistant Examiner* — Steven A Tullia
(74) *Attorney, Agent, or Firm* — Merchant & Gould P.C.

(57) ABSTRACT

A door latch operator comprising: one of a knob and a lever on a door configured to articulate in response to a linear force, wherein the linear force is perpendicular to a central, longitudinal axis of a latch; a transmission configured to translate the linear force into a rotational motion; and a latch bolt configured to extend from the latch absent the rotational motion and retract into the latch upon reception of the rotational motion.

19 Claims, 7 Drawing Sheets

(56) References Cited

U.S. PATENT DOCUMENTS

| | | | | |
|---|---|---|---|---|
| 2011/0314877 A1* | 12/2011 | Fang | ................ | E05B 53/00 |
| | | | | 70/91 |
| 2012/0198774 A1* | 8/2012 | Buck | ................ | E05B 1/0069 |
| | | | | 16/412 |
| 2014/0000170 A1* | 1/2014 | Buck | ................ | E05B 1/0053 |
| | | | | 49/353 |
| 2014/0311194 A1* | 10/2014 | Berger | ................ | E05B 1/003 |
| | | | | 70/101 |
| 2017/0074010 A1* | 3/2017 | Olson | ................ | E05B 1/0053 |
| 2020/0063470 A1* | 2/2020 | Yalamati | ................ | E05C 1/004 |

FOREIGN PATENT DOCUMENTS

| | | | | | |
|---|---|---|---|---|---|
| EP | 663502 | A1 | * | 7/1995 | ............ E05B 7/00 |
| GB | 2082665 | A | * | 3/1982 | ......... E05B 65/1066 |
| KR | 20160030613 | A | * | 9/2014 | ........... E05B 1/0038 |
| WO | WO-2005010301 | A2 | * | 2/2005 | ........... E05B 1/0038 |
| WO | WO-2012152277 | A1 | * | 11/2012 | ........... E05B 1/0092 |

\* cited by examiner

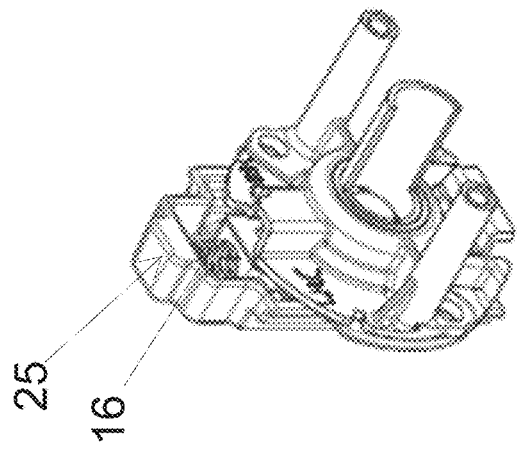
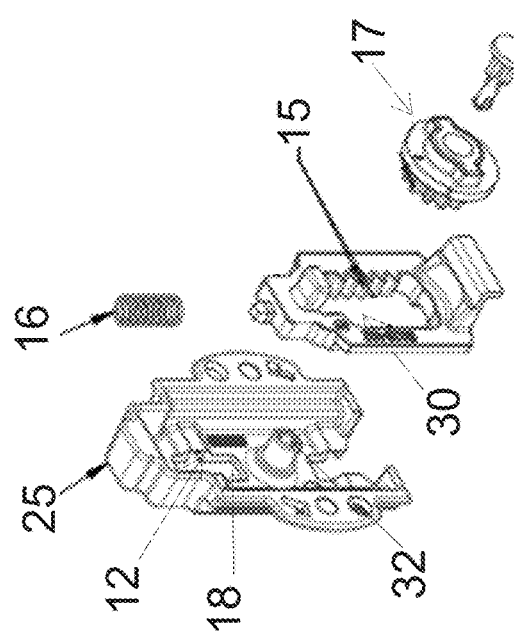

ADA DOOR KNOB

CROSS-REFERENCE TO RELATED APPLICATION

This application claims the benefit of U.S. Provisional Application Ser. No. 62/956,890, filed Jan. 3, 2020, the disclosure of which is hereby incorporated by reference in its entirety.

TECHNICAL FIELD

The present invention is related to the field of door hardware. More particularly, the present invention is related to the field of door latch operators.

BACKGROUND OF THE INVENTION

Door latches are commonly used to keep doors in a closed position. The latch extends from an edge of the door and into the door jamb. The latch may also be selectively retracted into a bore within the door thereby allowing the door to freely pivot open.

To retract the latch, a latch operator is included on both the interior and exterior sides of the door. The latch operator may be in the form of a knob, a lever, or another device that may be manually manipulated to retract the latch into the door.

One problem associated with manual operation of traditional latch operators is that they require a certain level of dexterity. When an operator is attempting to open the door while carrying objects such as a small child, groceries, a cell phone, or the like, it can be very frustrating and difficult to open the door. This frustration and difficulty stems from the fact that both a lever and a knob require precise placement and a firm grasp of the operator's hand. Operators routinely attempt to operate levers and knobs with their hip, thigh, knee, forearm, or other appendages, but the fact remains that these devices are designed for hand operation and as a result are quite difficult to operate without a hand.

Another problem with traditional levers is that the lever needs to be rotated to retract the latch. Simply pressing the lever in a downwardly direction does not provide enough rotational motion to retract the latch. For this reason, using one's knee or elbow will not rotate the lever sufficiently to open the door Similarly, door knobs require rotation with a firm grasp. Door knobs can be slippery and smooth making it even more difficult to rotate.

Door knobs and levers can be even more problematic for people with certain disabilities that impair or decrease motor skills including, but not limited to, Parkinson's Disease and Multiple Sclerosis. These diseases make it increasingly difficult to sustain enough grip on the door lever operator and rotate it at the same time.

There have, however, been advancements in the door lever operator field. Commercial establishments, for example, often use push bars mounted to a door that operate the door latch. Electronic door operators are also used that sense physical presence either optically or with weight sensors. Push buttons are also used to actuate automatic door openers.

These solutions all present a common problem in that they look commercial, do not include aesthetic designs, and are visually different than traditional door latch operators. This visual difference often is stigmatic to an individual with a disability. What is therefore needed is an improved door latch operator that is easily operable for all types of individuals, appears similar to traditional latch operators, and does not require rotational motion or a firm grasp in order to operate functionally.

OBJECTS AND SUMMARY OF THE INVENTION

A door latch operator may include either a door knob or a lever. The knob or lever is configured to articulate in response to a linear force, such as a user pushing down on the latch operator. This linear force is perpendicular to a central, longitudinal axis of a latch. The knob or lever also pivots about a point when it is pushed down, as opposed to rotating about a circle, like a traditional door knob or lever.

A transmission that is mounted to the surface of the door and concealed by a rose translates the applied linear force into a rotational motion. The rotational motion is then used by a latch within a bore of the door, thereby retracting a latch bolt into the door and extending the latch bolt out of the door when the linear force is completed. The latch bolt is sprung within the latch, which always extends the latch bolt when the linear force and rotational motion is absent. An adapter may also be used to join each knob or lever to the transmission.

An additional knob or lever, transmission, and rose may also be installed on the same door on the opposing side of the door. The additional knob or lever, transmission, and rose interact with the same door latch and latch bolt as described above.

The transmission includes a rack gear in mechanical communication with the knob or lever. The rack gear displaces due to the linear force applied to the knob or lever. A pinion gear that is in mechanical communication with the rack gear rotates upon displacement of the rack gear. The rotation of the pinion gear retracts the latch bolt into the latch, and a spring within the transmission returns the rack gear after the linear force is terminated, thereby extending the latch bolt from the latch. Additionally, a spring within the latch constantly urges the latch bolt to extend absent an additional force. The transmission includes at least one arm that extends into the bore in the door securing both the transmission and the latch in place.

When extended, the latch bolt extends from the door and may insert into a door jamb when the door is closed. In such a configuration, the door is prevented from opening. Once the linear force is applied to the lever or knob, the latch bold is retracted and the door may be opened.

BRIEF DESCRIPTION OF THE DRAWINGS

The present disclosure will be described hereafter with reference to the attached drawings which are given as non-limiting examples only, in which:

FIG. 2a shows a perspective view of an assembled transmission used in the door latch operator of FIG. 1.

FIG. 2b shows an exploded view of the transmission of FIG. 2a.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
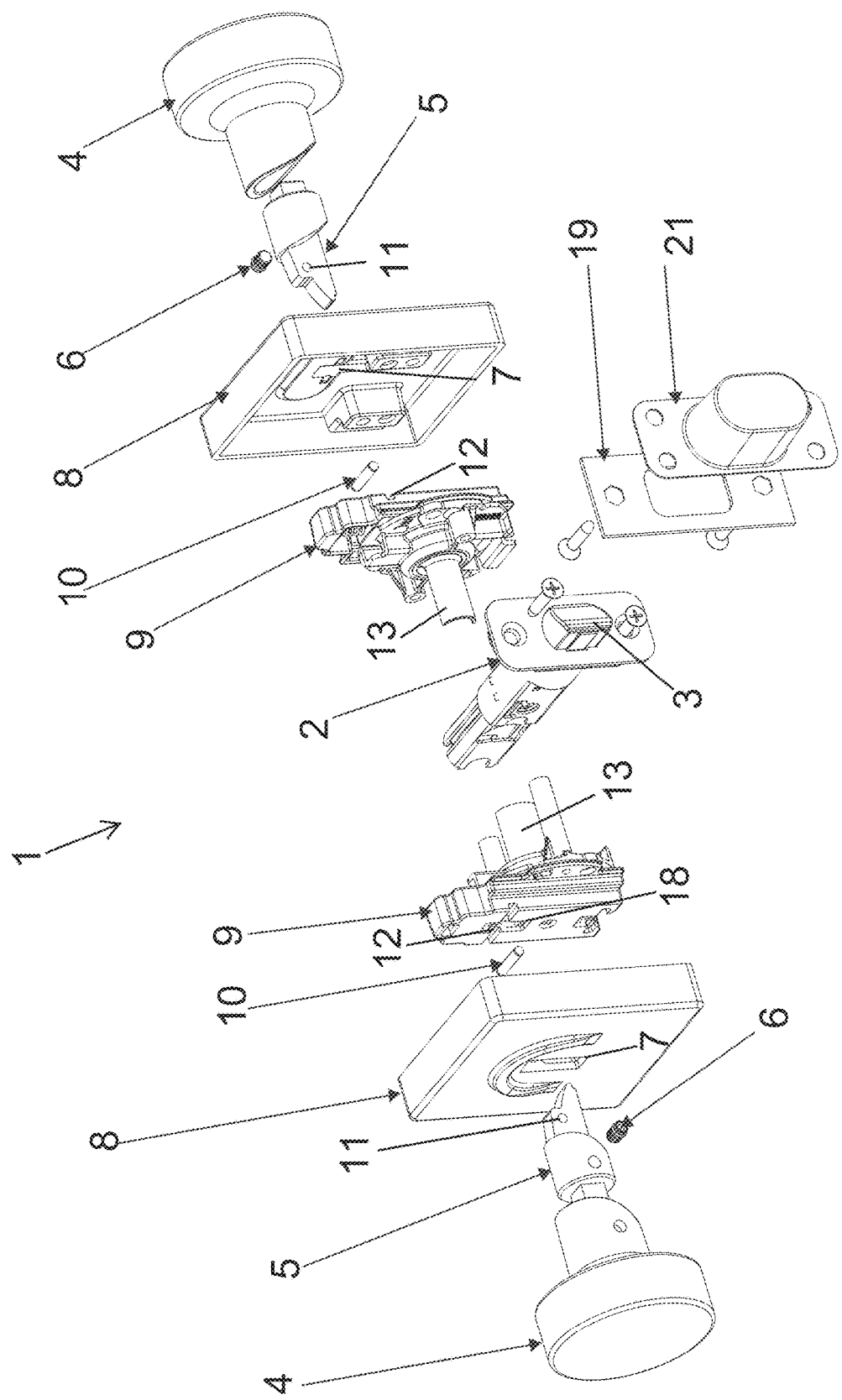
FIG. 1 shows an exploded, raised, perspective view of a door latch operator according to an embodiment of the invention.

FIG. 1 shows a door latch operator 1 in an exploded view. The door latch operator 1 controls the function of a latch 2. The latch 2 includes a latch bolt 3 that extends from the latch 2 (as shown in FIG. 1) and retracts into the latch 2. When extended with a closed door, the latch bolt 3 extends through a strike 19 and is protected by a strike box 21. In some examples, the latch bolt 3, when extended, extends into a door jamb. Manipulation of a knob 4, which may be replaced with a lever or any other object for manipulation (e.g., a switch), causes the latch bolt 3 to retract into the latch 2. When at rest, meaning absent any manipulation of the knob 4, the latch bolt 3 is extended from the latch 2. The latch bolt 3 is typically extended when at rest due to an internal spring within the latch 2. Manipulation of the knob 4, which consists of a downwardly and linear force to the knob 4, causes the latch bolt 3 to retract into the latch 2 thereby compressing the spring within.

The knob 4 is joined to an adapter 5 with a set screw 6. A slot 7 within a rose 8 allows the adapter 5 to penetrate the rose 8 and connect with a transmission 9. The rose 8 fully conceals the transmission 9 allowing it to be located outside of the door surface. The transmission 9 is therefore housed between the rose 8 and the surface of the door.

The transmission 9 converts the linear force applied to the knob 4 into a rotational motion necessary to retract the latch bolt 3 into the latch 2. A pivot pin 10 acts as the fulcrum for the adapter 5 as the linear force is applied to the knob 4. The pivot pin 10 is located in a pin slot 12 in the transmission 9. The pivot pin 10 is also passed through a pin bore 11 in the adapter 5. As the linear force is applied, the adapter 5 pivots about the pivot pin 10 which causes a rack gear 15 to move, as best shown in FIG. 2.

The transmission 9 is shown in exploded view in FIG. 2b as well as an assembled view, in FIG. 2a. The components of the transmission 9 are contained within a transmission housing 25. The transmission housing 25 has an opening 18 through which adapter 5 passes, as shown and described with respect to FIG. 1. The transmission housing 25 also includes the pin slot 12 formed in it to receive the pivot pin 10, also shown and described with respect to FIG. 1. Within the transmission housing 25, the rack gear 15 and a pinion gear 17 operate.

The adapter 5, shown in FIG. 1, normally has a force exerted upon it by a spring 16 within the transmission housing 25. The spring force pushes the rack gear 15 and the adapter 5 downwardly within the transmission housing 25. This makes the knob 4 pitch upwardly since the pivot pin 10 reverses the direction of the force. The adapter 5 inserts into a rack slot 30. When an operator applies a downwardly force to the knob 4, the adapter 5 pivots on the pivot pin 10 causing the adapter 5 to rise within the rack slot 30. As the adapter 5 rises within the rack slot 30, it urges the rack gear 15 upwardly, thereby compressing the spring 16. Once the downwardly force is removed from the knob 4 by the operator, the spring 16 returns the rack gear 15 in a downward direction which causes the knob 4 to rise. In other words, the knob 4 and adapter 5 act as a lever and the pivot pin 12 as a fulcrum.

The pinion gear 17 is located within the rack gear 15. The teeth of the pinion gear 17 mesh with the teeth of the rack gear 15. The pinion gear 17 is pinned to the transmission housing 25 with a pin 31 passing through the pinion gear 17 and into a pin hole 32. The pin 31 allows the pinion gear 17 to rotate as the rack gear 15 is displaced by either the spring 16 or the adapter 5. An arm 13 transfers the rotational motion of the pinion gear 17 to the latch 2, as seen in FIG. 1. The arm 13 is held in place between the pinion gear 17 and a mounting plate 26 by a collar 33 and a spring 34. The mounting plate 26 ensures the transmission 9 always remains connected to the latch 2 while the arm 13 is transferring rotational motion from the pinion gear 17 to the latch 2.

Figure 3:
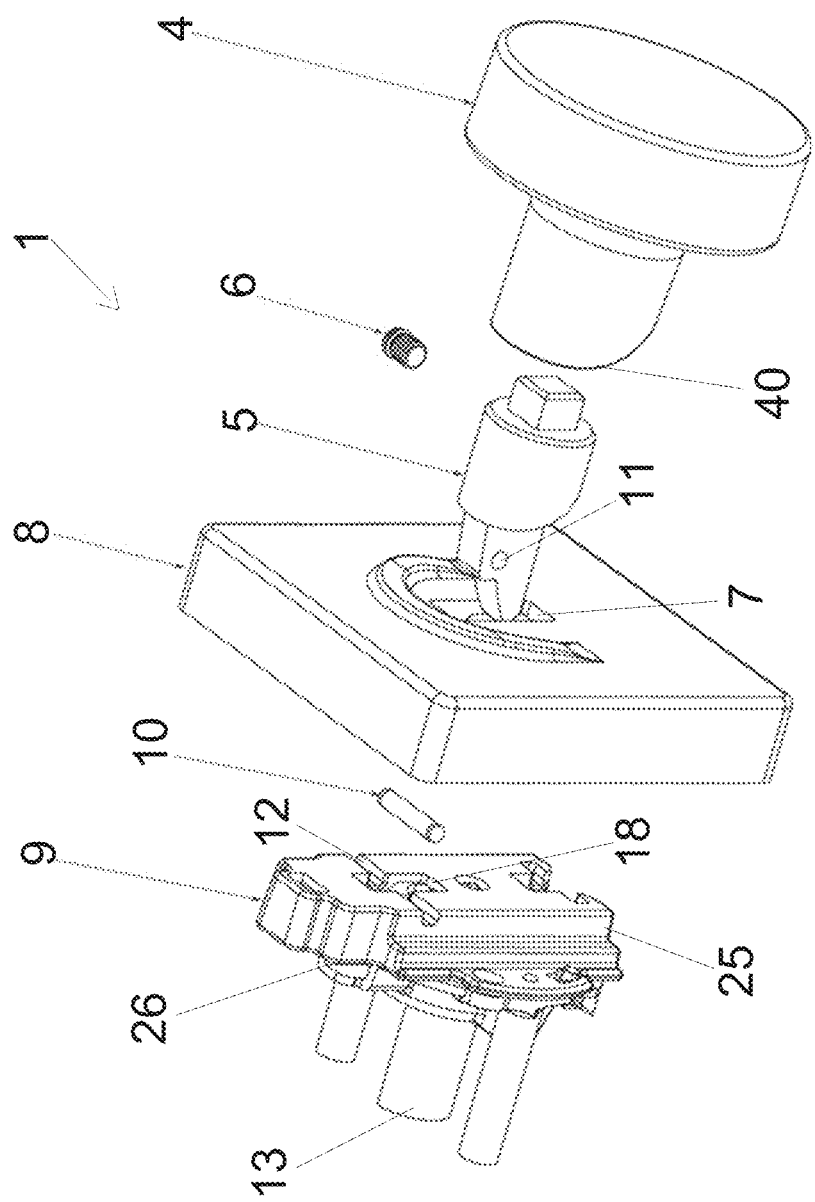
FIG. 3 shows a raised, perspective, partially exploded view of the transmission of FIG. 2 as used with a representative door knob.
Figure 4:
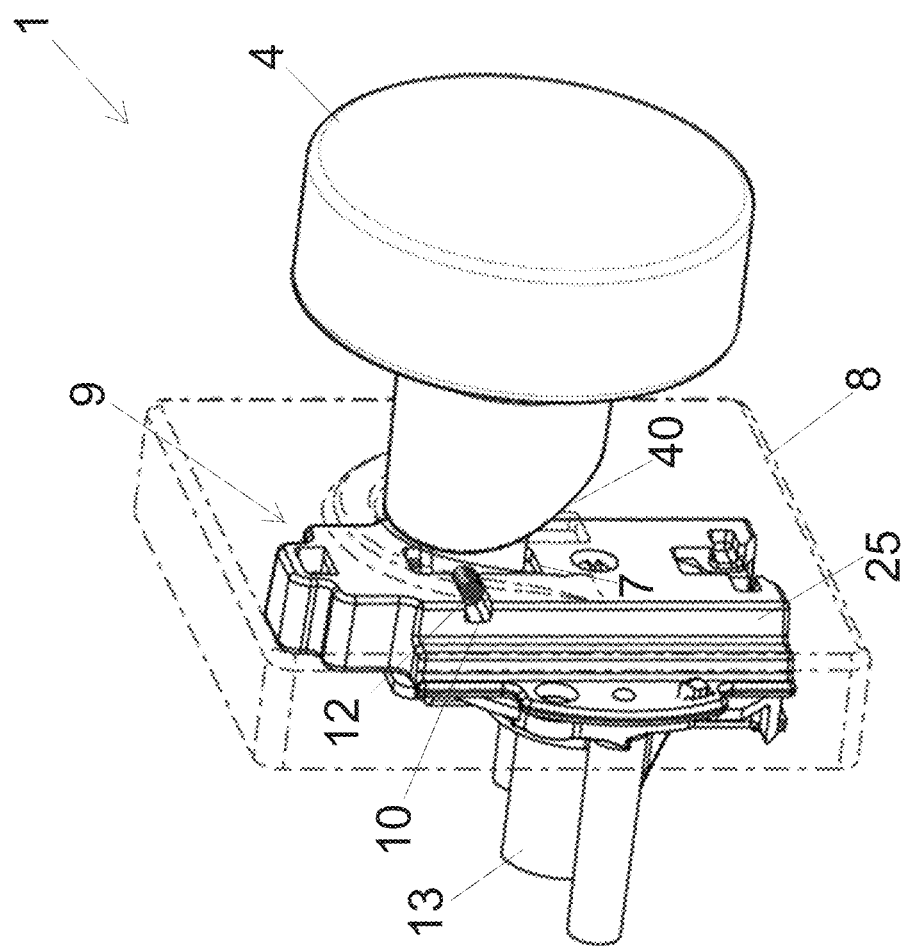
FIG. 4 shows a raised, perspective view of the transmission of FIGS. 2a and 2b as used with a representative door knob.

FIG. 3 shows the knob 4, adapter 5, rose 8, and transmission 9 assembly in an exploded view, while FIG. 4 shows the same components assembled. The knob 4 receives the adapter 5 and they are fastened together with the set screw 6. The adapter 5 is inserted into the slot 7 in the rose 8 and then into opening 18 in the transmission housing 25. The pivot pin 10 is passed through the pin bore 11 in the adapter 5 and rests in the pin slot 12 in the transmission housing 25. The arm 13 extends from the mounting plate 26 and controls operation of the latch 2 (shown in FIG. 1). A chamfered edge 40 provided on the knob 4 allows the knob 4 to be pivoted downwardly about the pivot pin 10 without obstruction from the rose 8.

Figure 5B:
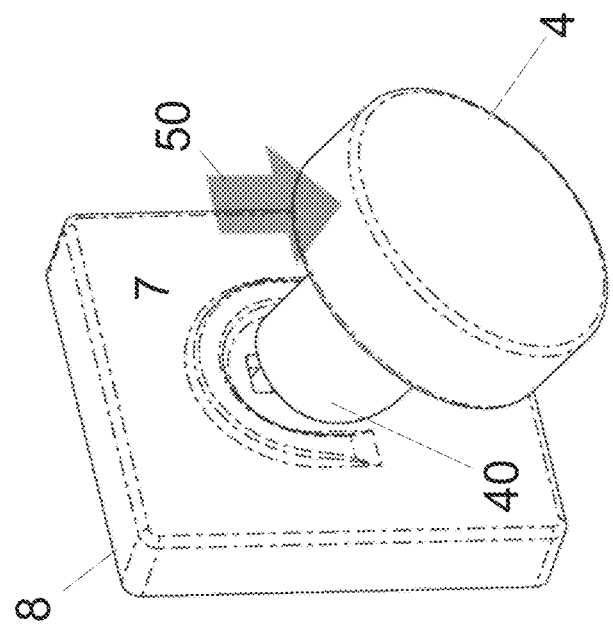
FIGS. 5a and 5b show a raised, perspective view of the representative door knob of FIG. 4 in various operative positions.
Figure 5A:
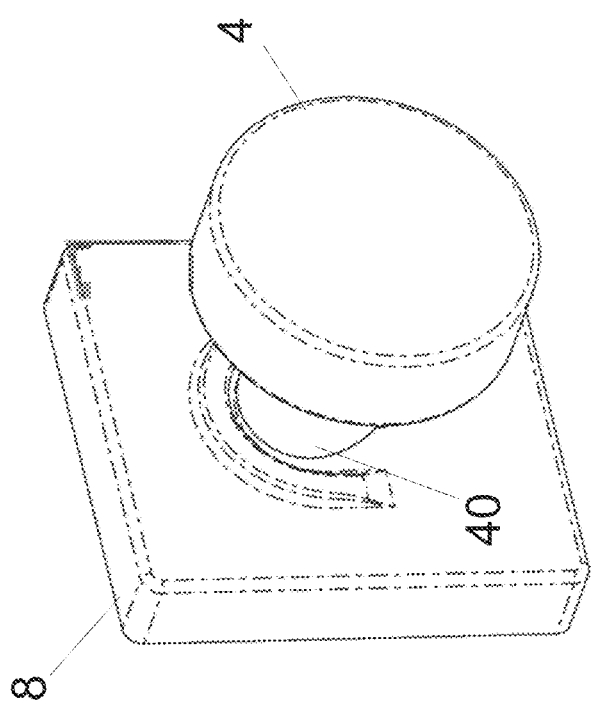

The pivoting action of the knob 4 is best shown in FIGS. 5a and 5b. FIG. 5a shows the knob 4 in the rested, horizontal position. FIG. 5b shows the knob 4 with a linear force 50 applied in a downwardly direction thereby pivoting the knob 4 down to retract the latch bolt 3 into the latch 2 (see FIG. 1, for example). The chamfered edge 40 on the knob 4 is shown pivoted in FIG. 5b exposing the slot 7 in the rose 8. In FIG. 5a, the slot 7 is fully concealed as the knob 4 is in a horizontal position and at rest without an external, linear force 50.

Figure 6A:
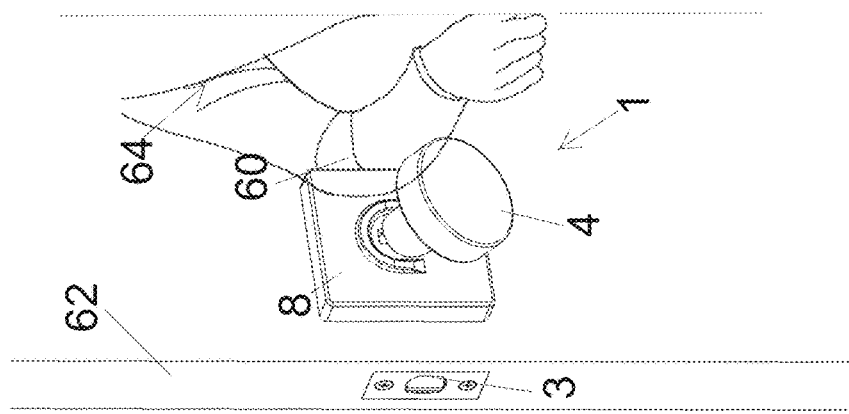
FIG. 6a shows a raised, perspective view of the representative door knob of FIG. 4 in a first operative position.
Figure 6B:
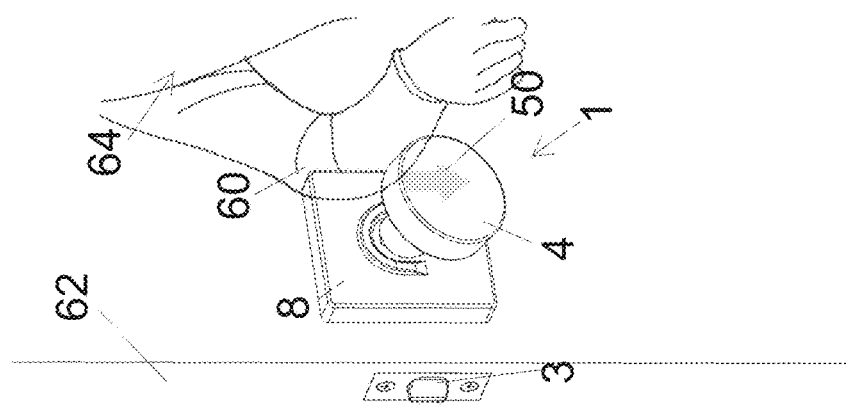
FIG. 6b shows a raised, perspective view of the representative door knob of FIG. 4 in a second operative position.
Figure 6C:
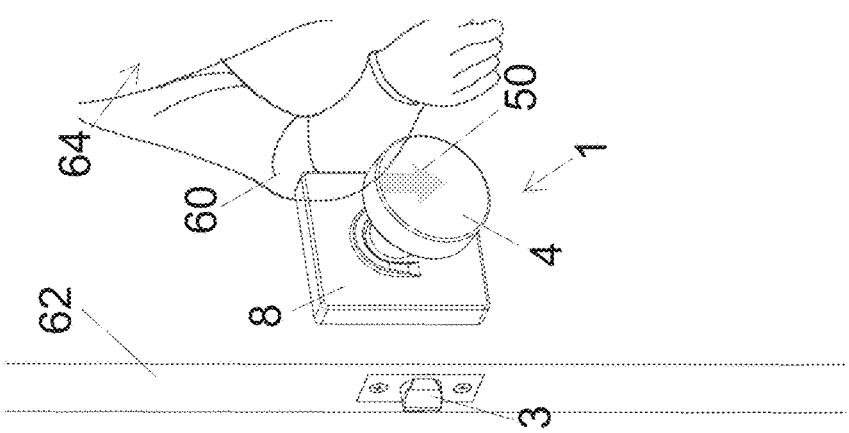
FIG. 6c shows a raised, perspective view of the representative door knob of FIG. 4 in a third operative position.
Figure 6D:
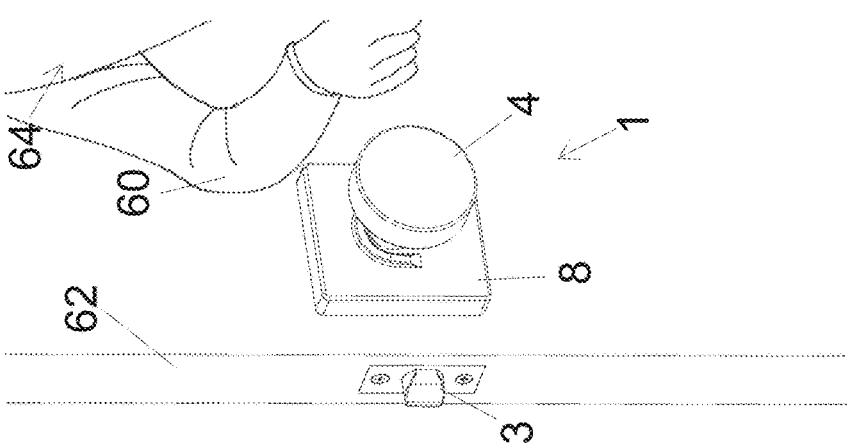
FIG. 6d shows a raised, perspective view of the representative door knob of FIG. 4 in a fourth operative position.

The linear force 50 can be applied by an operator's hand, forearm, elbow, hip, or any other appendage. Since the knob 4 does not need to be rotated, a grasp on the knob 4 is not necessary to actuate the latch 2. FIGS. 6a-6d, for example, show a sequence of operations where the door latch operator 1 is in use. FIG. 6a shows the knob 4 at rest in a horizontal position. An operator 64 is approaching the door 62 intending to operate the latch bolt 3 with a forearm 60. The latch bolt 3 is also shown extending from the door 62 since the knob 4 is in the horizontal, at-rest position. The operator 64 begins to apply a linear force 50 in a downwardly direction to the knob 4, as shown in FIG. 6b, and the latch bolt 3 begins to retract into a bore within the door 62. As the linear force 50 increasingly pivots the knob 4, as shown in FIG. 6c, the latch bolt 3 retracts further into the bore in the door 62. Finally, FIG. 6d shows the knob 4 fully pivoted by the forearm 60 of the operator 64 and the latch bolt 3 fully retracted into the bore of the door 62.

If a lever were used in place of a knob 4, it could be operated in similar fashion. A typical lever used with latches according to the prior art requires more than a linear force to actuate a latch. Traditional solutions require rotation of over 90 degrees, which means a single, linear force is not adequate. The force applied to a traditional latch operator needs to change directions to actuate the latch. This makes it very difficult to actuate the latch without a grasp on the lever. The door latch operator 1 according to the invention does not require either a firm grasp or rotation over 90 degrees.

Figure 7B:
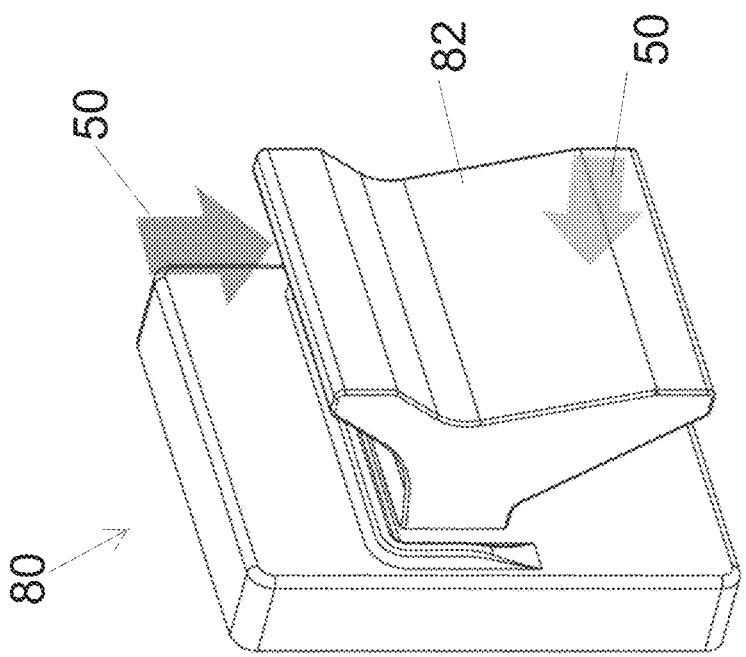
FIG. 7b shows a raised, perspective view of another door latch operator, according to an embodiment of the invention.
Figure 7A:
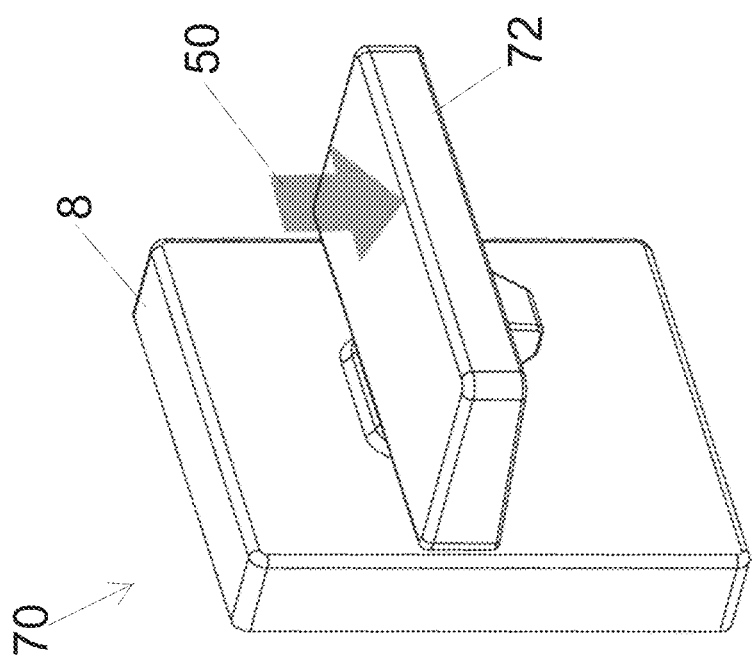
FIG. 7a shows a raised, perspective view of a door latch operator, according to an embodiment of the invention.

FIG. 7a and FIG. 7b show two different embodiments of the invention. The transmission 9 is concealed by the rose 8 in both alternate embodiments 70 and 80. A switch 72 is shown in FIG. 7a where a similar, linear force 50 may be applied to operate the latch 2 (not shown). FIG. 7b shows another style of a switch where the linear force 50 may be applied in multiple locations or planes to actuate the latch (not shown). A horizontal, linear force 50 may be applied to a switch 82 toward the rose 8 or a vertical, downwardly linear force 50 may be exerted onto the switch 82 to cause the pivoting action necessary to actuate the latch.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A door latch operator comprising:
   a knob on a door configured to articulate in response to a linear force, wherein the linear force is perpendicular to a central, longitudinal axis of a latch, wherein the knob includes a proximal end having a chamfered edge;
   a transmission configured to translate the linear force into a rotational motion, the transmission including a housing defining a pin slot and an opening, the pin slot parallel to the central, longitudinal axis of the latch;
   a latch bolt configured to extend from the latch absent the rotational motion and retract into the latch upon reception of the rotational motion;
   a rose configured to enclose the transmission between the door and the rose, the rose defining a slot aligned with the opening of the housing of the transmission;
   a pivot pin located in the pin slot of the housing of the transmission; and
   an adapter joining the proximal end of the knob to the transmission, the adapter pivotably supported by the pivot pin and extending through both the opening of the housing of the transmission and the slot of the rose, wherein the adapter includes an annular shoulder disposed outside of the rose and configured to couple to the proximal end of the knob, the annular shoulder having a chamfered surface that corresponds to the chamfered edge of the knob.

2. The door latch operator according to claim 1, further comprising a door with an interior side and an exterior side, wherein the door latch operator is installed on both the interior side and the exterior side of the door, each configured to retract the latch.

3. The door latch operator according to claim 1, further comprising:
   a rack gear in mechanical communication with the knob configured to displace the linear force applied to the knob; and
   a pinion gear in mechanical communication with the rack gear configured to rotate upon displacement of the rack gear;
   wherein the rotation of the pinion gear retracts the latch bolt into the latch, and wherein a spring within the transmission returns the rack gear after the linear force is terminated, thereby extending the latch bolt from the latch.

4. The door latch operator according to claim 2, wherein the latch bolt inserts into a door jamb when the latch bolt is extended from the latch and retracts out of the door jamb when the latch bolt is retracted into the latch, thereby preventing the door from opening when the door is in a closed position and the latch bolt is extended into the doorjamb, and allowing the door to be moved to an open position when the latch bolt is retracted into the latch.

5. The door latch operator according to claim 2, wherein the latch is mounted within a bore in the door and the transmission mounts to the exterior side of the door.

6. The door latch operator according to claim 5, wherein the transmission includes at least one arm extending into the bore in the door and interacting with the latch.

7. The door latch operator according to claim 1, further comprising a second transmission, wherein the transmission is located on an exterior side of a door and the second transmission is located on an interior side of the door, opposite the exterior side.

8. A method of operating a door latch comprising the steps of:
   applying a downwardly force to a door latch operator of the door latch, the door latch operator including a knob with a proximal end having a chamfered edge and the door latch including a rose enclosing a transmission between a door and the rose;
   pivoting the door latch operator in a downwardly direction tangent to an arc that intersects the door, wherein an adapter including an annular shoulder having a chamfered surface that corresponds to the chamfered edge of the knob joins the door latch operator to the transmission, the adapter pivotably supported by a pivot pin located in a pin slot of a housing of the transmission, the adapter also extending through both an opening defined in the housing of the transmission and an aligned slot defined in the rose, wherein the annular shoulder is disposed outside of the rose;
   translating the downwardly force to a rotational motion with the transmission having a rack gear and a pinion gear; and
   retracting a door latch bolt from an extended position to a retracted position with the rotational motion as the door latch operator is pivoted;
   wherein the downwardly force causes the door latch operator to pivot about the pivot pin disposed between a surface of the door and the rose, wherein the pivot pin is substantially orthogonal relative to the downwardly force, and wherein the chamfered edge of the knob and the chamfered surface of the adapter allows the door latch operator to be pivoted downward without obstruction from the rose.

9. The method of operating a door latch according to claim 8, further comprising concealing the transmission between the surface of the door and the rose.

10. The method of operating a door latch according to claim 8, further comprising installing the transmission on the surface of the door and installing a second transmission on an opposing surface of the door, wherein each respective transmission operates independently.

11. The method of operating a door latch according to claim 8, further comprising extending the door latch bolt into a door jamb when the downwardly force is absent and retracting the door latch bolt out of the door jamb when the downwardly force is applied to the door latch operator.

12. A door latch operator comprising:
- a door with a latch located within a bore on a door jamb side of the door;
- a knob on the door configured to articulate in response to a linear force between at least a horizontal position and a pivoted position, wherein the linear force is perpendicular to a central, longitudinal axis of the latch, wherein the knob includes a proximal end having a chamfered edge;
- a transmission configured to translate the linear force into a rotational motion, the transmission including a housing defining a pin slot and an opening, the pin slot parallel to the central, longitudinal axis of the latch;
- a latch bolt configured to extend from the latch and the door jamb side of the door when in a rested state and retract into the latch and the door jamb side of the door when the linear force is applied;
- a rose configured to enclose the transmission between the door and the rose, the rose defining a slot aligned with the opening of the housing of the transmission;
- a pivot pin located in the pin slot of the housing of the transmission; and
- an adapter joining the proximal end of the knob to the transmission, the adapter pivotably supported by the pivot pin and extending through both the opening of the housing of the transmission and the slot of the rose, wherein the adapter includes an annular shoulder disposed outside of the rose and configured to couple to the proximal end of the knob, the annular shoulder having a chamfered surface that corresponds to the chamfered edge of the knob, and when the knob is pivoted from the horizontal position towards the pivoted position, the chamfered edge of the knob and the chamfered surface of the adapter allows the knob to pivot without obstruction from the rose.

13. The door latch operator according to claim 12, wherein the adapter transfers the linear force to the transmission.

14. The door latch operator according to claim 12, wherein the transmission comprises:
- a rack gear in mechanical communication with the knob configured to displace the linear force applied to the knob; and
- a pinion gear in mechanical communication with the rack gear configured to rotate upon displacement of the rack gear;
- wherein the rotation of the pinion gear retracts the latch bolt into the latch.

15. The door latch operator according to claim 12, wherein the latch bolt inserts into the door jamb when the latch bolt is extended from the latch and retracts out of the door jamb when the latch bolt is retracted into the latch, thereby preventing the door from opening when the door is in a closed position and the latch bolt is extended into the door jamb, and allowing the door to be moved to an open position when the latch bolt is retracted into the latch.

16. The door latch operator according to claim 12, wherein the transmission mounts to an exterior surface of the door.

17. The door latch operator according to claim 12, wherein the transmission includes at least one arm extending into the bore in the door and interacting with the latch.

18. The door latch operator according to claim 12, further comprising a second transmission, wherein each transmission is mounted to opposing surfaces of the door and wherein each transmission is concealed with the rose.

19. The door latch operator according to claim 12, wherein the pivot pin is captured between the housing of the transmission and the rose.

\* \* \* \* \*